United States Patent
Atoche-Juarez et al.

(10) Patent No.: US 6,820,947 B2
(45) Date of Patent: *Nov. 23, 2004

(54) METHOD AND DEVICE FOR CONTROLLING A BRAKING ACTION OF AT LEAST ONE WHEEL BRAKE OF A FOUR-WHEEL-DRIVE MOTOR VEHICLE

(75) Inventors: Carlos Atoche-Juarez, West Bloomfield, MI (US); John Gatza, Linden, MI (US); Michael Lindemann, Southfield, MI (US); John Y. Liu, San Marino, CA (US)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/475,297

(22) Filed: Dec. 29, 1999

(65) Prior Publication Data

US 2002/0057014 A1 May 16, 2002

(30) Foreign Application Priority Data

Dec. 29, 1998 (DE) .......................................... 198 59 964

(51) Int. Cl.⁷ .............................. B60T 8/58; B60T 8/26; B60T 8/32; B60T 8/60; B60T 8/62
(52) U.S. Cl. ........................ 303/190; 303/186; 303/143; 303/191
(58) Field of Search ................................. 303/190, 186, 303/143, 9.62, 155, 157, 158, 167, DIG. 6, DIG. 2, 146, 147, 187, 188; 701/78

(56) References Cited

U.S. PATENT DOCUMENTS

| | | | |
|---|---|---|---|
| 4,589,511 A | * | 5/1986 | Leiber .......................... 180/197 |
| 4,746,173 A | * | 5/1988 | Fennel et al. ................ 303/100 |

(List continued on next page.)

FOREIGN PATENT DOCUMENTS

| | | | | |
|---|---|---|---|---|
| CH | 693791 | * | 2/2004 | |
| DE | 40 07 360 | | 9/1991 | |
| DE | 195 16 120 | | 11/1995 | |
| DE | 196 11 491 | | 9/1997 | |
| DE | 197 38 947 | | 3/1998 | |
| DE | 019859964 A1 | * | 9/2000 | |
| DE | 019859964 C2 | * | 5/2003 | |
| JP | 2000198433 A | * | 7/2000 | ............. B60T/8/58 |
| WO | WO-9630241 A1 | * | 3/1996 | |
| WO | WO-9700799 A1 | * | 1/1997 | |
| WO | WO-9803379 A1 | * | 1/1998 | |

OTHER PUBLICATIONS

Bosch Technische Berichte (Bosch Technical Reports) vol. 7 (1980), No. 2, pp. 65–94.

Primary Examiner—Douglas C. Butler
(74) Attorney, Agent, or Firm—Kenyon & Kenyon

(57) ABSTRACT

Method and device for controlling the braking action of at least one wheel brake of a four-wheel-drive motor vehicle having at least one rear axle and one front axle. A first rpm signal representing the speeds of rotation of the front-axle wheels and a second rpm signal representing the speeds of rotation of the rear-axle wheels are detected. The difference between the first and second rpm signals is then determined, and braking action is controlled as a function of the difference that has been determined.

20 Claims, 3 Drawing Sheets

U.S. PATENT DOCUMENTS

| | | | | |
|---|---|---|---|---|
| 4,753,312 A | * | 6/1988 | Burgdorf et al. | 180/197 |
| 4,784,236 A | * | 11/1988 | Bausch et al. | 180/249 |
| 4,943,922 A | * | 7/1990 | Tanaka | 303/186 |
| 5,163,742 A | | 11/1992 | Töpfer et al. | |
| 5,197,566 A | * | 3/1993 | Watanabe et al. | 180/249 |
| 5,415,469 A | * | 5/1995 | Poggenburg et al. | 303/186 |
| 5,452,947 A | * | 9/1995 | Ehmer et al. | 303/150 |
| 5,458,405 A | * | 10/1995 | Watanabe | 303/113.1 |
| 5,492,312 A | * | 2/1996 | Carlson | 267/140.14 |
| 5,556,174 A | * | 9/1996 | Wiss et al. | 180/197 |
| 5,560,690 A | * | 10/1996 | Hattori et al. | 303/116.2 |
| 5,586,815 A | * | 12/1996 | Negrin | 303/143 |
| 5,615,935 A | * | 4/1997 | Beyer et al. | 303/195 |
| 5,634,699 A | * | 6/1997 | Ichikawa et al. | 303/150 |
| 5,699,871 A | * | 12/1997 | Hara et al. | 180/247 |
| 5,700,074 A | * | 12/1997 | Sugimoto et al. | 303/186 |
| 5,797,664 A | * | 8/1998 | Tagawa | 303/190 |
| 5,860,710 A | * | 1/1999 | Takemasa | 303/190 |
| 6,012,010 A | * | 1/2000 | Batistic et al. | 701/72 |
| 6,223,115 B1 | * | 4/2001 | Batistic | 303/186 |

* cited by examiner

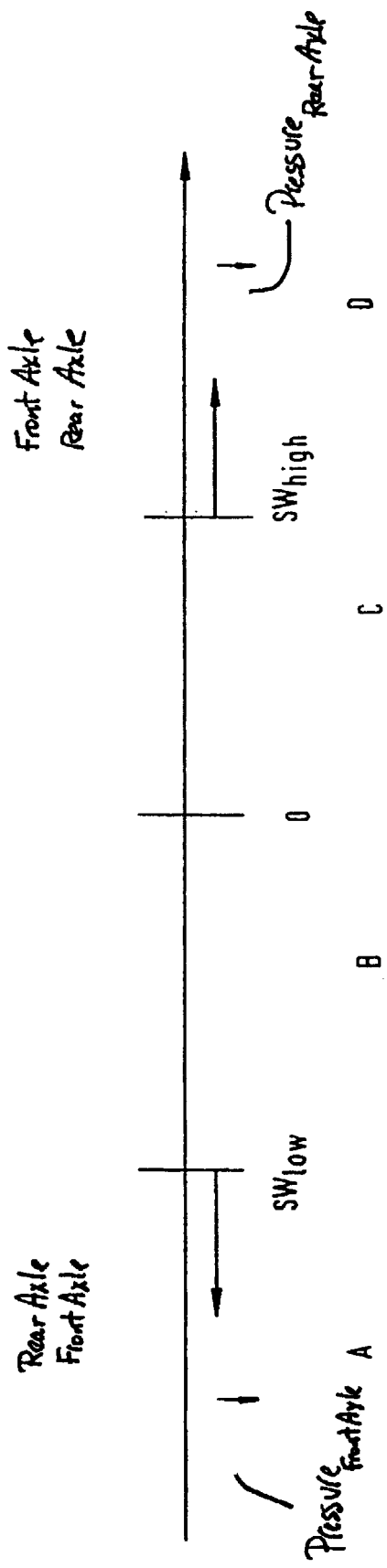

METHOD AND DEVICE FOR CONTROLLING A BRAKING ACTION OF AT LEAST ONE WHEEL BRAKE OF A FOUR-WHEEL-DRIVE MOTOR VEHICLE

BACKGROUND OF THE INVENTION

Exemplary conventional anti-lock brake systems (ABS systems) are described in, e.g., Bosch Technische Berichte (Bosch Technical Reports) Vol. 7 (1980), No. 2. In such anti-lock control systems, the brake systems of the vehicle wheels are controlled in such a way that brake pressure is modified as a function of an instability value. Thus, this instability value is generated as a function of the wheel movement that has been detected, generally the wheel rpm. In particular, this instability value is a combination of the instantaneous circumferential deceleration or acceleration of the wheel and the brake slippage. Modification of an instability value of this kind is described in German Patent Application No. 196 11 491.

As described in German Patent Application No. 195 16 120 (corresponding to U.S. Pat. No. 5,556,174), in the case of front-wheel-drive vehicles it is known that vibrations occur at the driven wheels during ABS control procedures, these being caused by flexibility between the engine and the wheels. In order to detect these vibrations, the speed at the drive axle differential is determined. It is then determined whether this speed has superimposed thereon a signal having a frequency which lies within a range defined by the drive train vibrations. In response to the drive train vibrations detected, the activation times of the brake pressure control devices are modified so that the drive train vibrations decay.

Furthermore, vehicles in which the wheels on the rear axle as well as those on the front axle are driven are known. As a general rule, in four-wheel-drive vehicles of this kind, the differential/differential gear unit can be locked, at least partially. In four-wheel-drive vehicles, axle vibrations may occur during ABS braking, particularly if a differential/differential gear unit is at least partially locked.

One of the objects of the present invention is to dampen the vibrations in the drive train in four-wheel-drive vehicles in an effective manner.

SUMMARY OF THE INVENTION

The present invention relates to a method and device for controlling the braking action of at least one wheel brake of a four-wheel-drive motor vehicle having at least one rear axle and one front axle. Thus, a first rpm signal representing the speeds of rotation of the front-axle wheels and a second rpm signal representing the speeds of rotation of the rear-axle wheels are detected. Next, the difference between the first and second rpm signals is determined and braking action is controlled as a function of the difference that has been determined.

In particular, a quantity representing the characteristics of the road, and in particular, the coefficient of friction of the road, is determined, and braking action is subjected to control based on the difference that has been determined if the quantity is less than a threshold value. The braking action may only be subjected to control as a function of the difference that has been determined if the quantity that has been determined is less than a threshold value.

In one embodiment of the present invention, particularly in the drive train, the motor vehicle has a differential/differential gear unit that can be at least partially locked. The braking action is subjected to control according to the present invention as a function of the difference that has been determined if the differential/differential gear unit is at least partially locked.

As described above, in four-wheel-drive motor vehicles having a lockable differential, the coupling between the drive train and the driven wheels can cause axle vibrations during an anti-lock control procedure, in particular due to stress acting on the wheels. In particular, this occurs on road surfaces having a relatively low coefficient of friction (e.g., in ice or snow). These axle vibrations may impair the efficacy of the anti-lock control system (ABS), which is intended to diminish the wheels' tendency to lock by braking interventions. They may also impair driving and braking comfort during braking procedures on road surfaces having a low or medium coefficient of friction (i.e., in ice or snow).

As part of an ABS control procedure, it is preferable to determine a reference speed that represents the vehicle's forward speed. As a general rule, this is based on the wheel rpm rates that have been detected. Axle vibrations having a high frequency and the resulting resonances may disrupt detection of the reference speed and thus considerably disrupt the entire ABS control procedure. According to the present invention, the level of axle vibrations is measured by determining, for each axle, the difference $$DV_{axle} = (V\_VL + V\_VR) - (V\_HL + V\_HR)$$

between wheel speeds ($V\_VL$, $V\_VR$, $V\_HL$, $V\_HR$).

The measure designed to counteract axle vibrations according to the present invention prevents and damps the vibrations in an effective manner, and is therefore suitable for preventing these vibrations or reducing their level, so that ABS control remains fully effective.

It is also advantageous to subject the braking action to control according to the present invention as a function of difference $DV_{axle}$ that has been determined if difference $DV_{axle}$ that has been determined is less than and/or greater than at least one threshold value. The braking action may only be subjected to control as a function of the difference that has been determined if difference $DV_{axle}$ that has been determined is less than and/or greater than at least one threshold value.

In the case of hydraulic brake systems, the braking action is controlled by feeding/discharging brake fluid to/from the wheel brakes. As a general rule, controllable intake/discharge valves are provided for this purpose. As soon as the axle vibrations have been measured via quantity $DV_{axle}$, these axle vibrations are prevented/damped/reduced according to the present invention by generating suitable activation values for the brake fluid intake/discharge valves, so that quantity $DV_{axle}$ is reduced as soon as it exceeds a specific positive threshold value or falls below a specific negative threshold value. There are two options for this:

According to a first option, braking action is controlled as a function of determined difference $DV_{axle}$ in such a way that braking action is increased on the vehicle axle having the higher rpm rates.

According to a second option, braking action is controlled as a function of determined difference $DV_{axle}$ in such a way that braking action is reduced on the vehicle axle having the lower rpm rates.

As described above, in the ABS systems, the braking action is generally modified as a function of an instability value. An activation of the intake/discharge valves for the brake fluid is based on this instability value. To allow the braking action in the ABS system to be subjected to control (e.g., an increase or reduction of the braking pressure) as a function of vibration value $DV_{axle}$ according to the present invention, the instability value is modified as a function of value $DV_{axle}$.

One of the objects of the present invention is to reduce the axle vibrations, represented by value $DV_{axle}$, and/or keep them as low as possible so that no difficulties will be expected with the ABS control procedure. For safety reasons, preferably only the braking action and/or the brake pressure are subjected to the reduction described above as a function of $DV_{axle}$.

BRIEF DESCRIPTION OF THE DRAWINGS

FIG. 3 shows an illustration of threshold values for an axle vibration.

DETAILED DESCRIPTION

Figure 1:
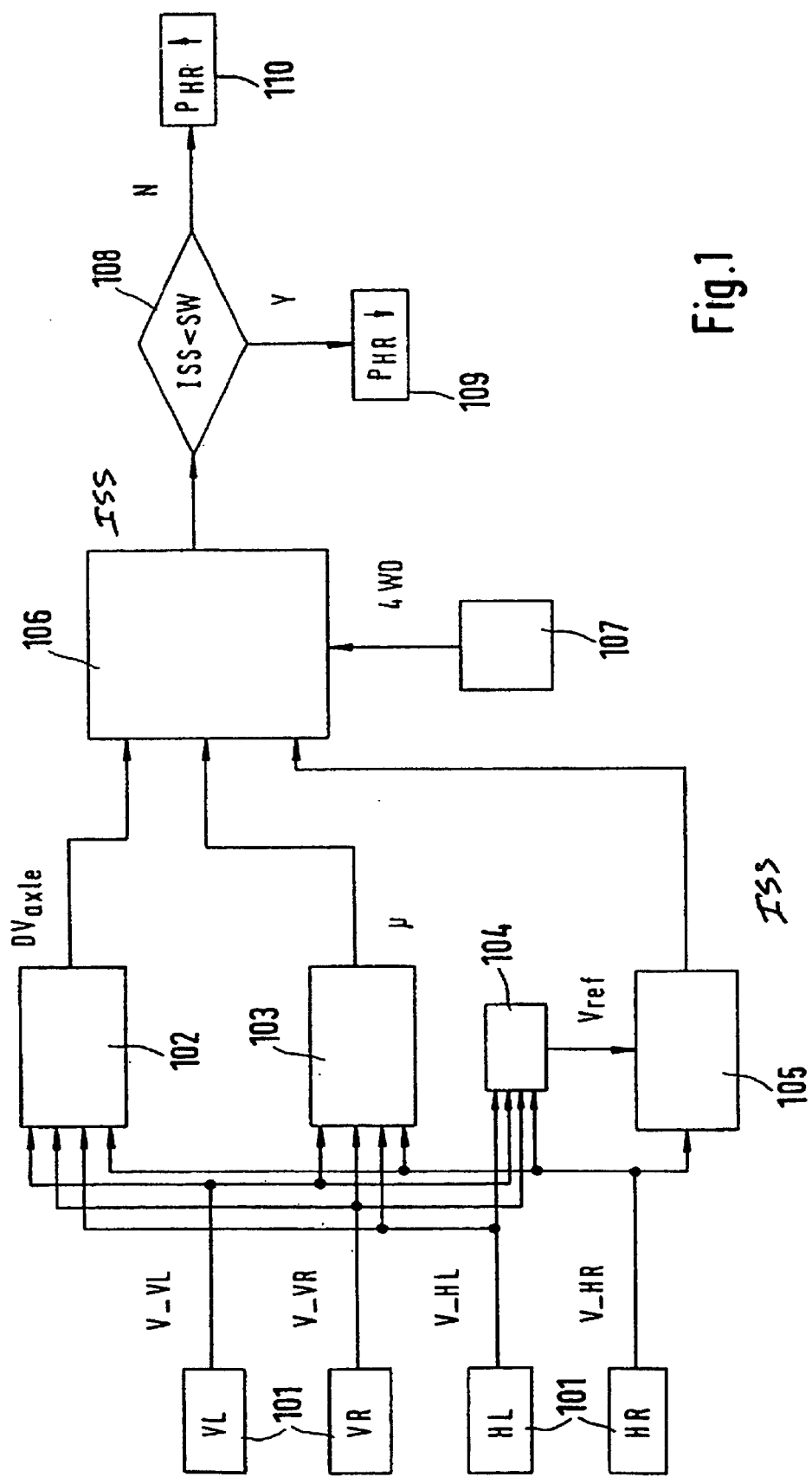
FIG. 1 shows a block diagram of a system and method according to the present invention.

FIG. 1 shows a block diagram that provides an overview of a device and method according to the present invention, and illustrates a schematic diagram of a braking control on the right rear vehicle wheel.

Wheel rpm sensors 101VL, 101VR, 101HL and 101HR detect wheel rpm rates/speeds of rotation of the wheels V_VL, V_VR, V_HL and V_HR. In block 104, reference speed $V_{ref}$, which represents the vehicle's forward speed, is generated in a known manner from the wheel rpm rates. In block 103, coefficient of friction $\mu$ of the road surface is generated. This is carried out in a known manner, as a function of the rpm rates and if necessary other values.

In block 105, instability value ISS is generated. In a conventional anti-lock control system, block 105 may be designed so that an instability value ISS is generated according to the formula:

$$ISS = K1 * ahl + K2 * \lambda + K3 * ARS.$$

K1, K2 and K3 are amplification factors and ARS is an offset for the control start threshold. Wheel deceleration ahl and brake slippage $\lambda$ are negative values.

Essentially, instability conditions in normal ABS control, via which the operating point for normal anti-lock control can be determined, are queried using the instability value thus generated. Thus, there are two ranges (see blocks 108, 109 and 110):

ISS<SW (e.g., SW=0): (right rear) wheel is unstable, reduce (right rear) wheel brake pressure (block 109: $P_{HR}\downarrow$).

ISS≧SW (e.g., SW=0): (right rear) wheel is stable, increase (right rear) wheel brake pressure (block 110: $P_{HR}\uparrow$).

The exemplary embodiment of the present invention described herein involves brake intervention on, e.g., the right rear wheel brake (index: HR).

Furthermore, the exemplary embodiment of the method described above used to determine the instability value is only one of many possible methods. Particularly in the case of brake controllers and/or drive controllers which work on the basis of moment, the instability value to be influenced in the context of the present invention may be a wheel moment.

In block 102, quantity $DV_{axle}$, which represents the level of axle vibrations is determined:

$$DV_{axle} = (V\_VL + V\_VR) - (V\_HL + V\_HR)$$

Signal 4 WD sent from block 107 indicates whether four-wheel-drive having a locked differential is involved. The flowchart shown in FIG. 2 is used to illustrated how instability value ISS is modified in block 106 according to the present invention; the example shown involves the right rear wheel brake.

Figure 2:
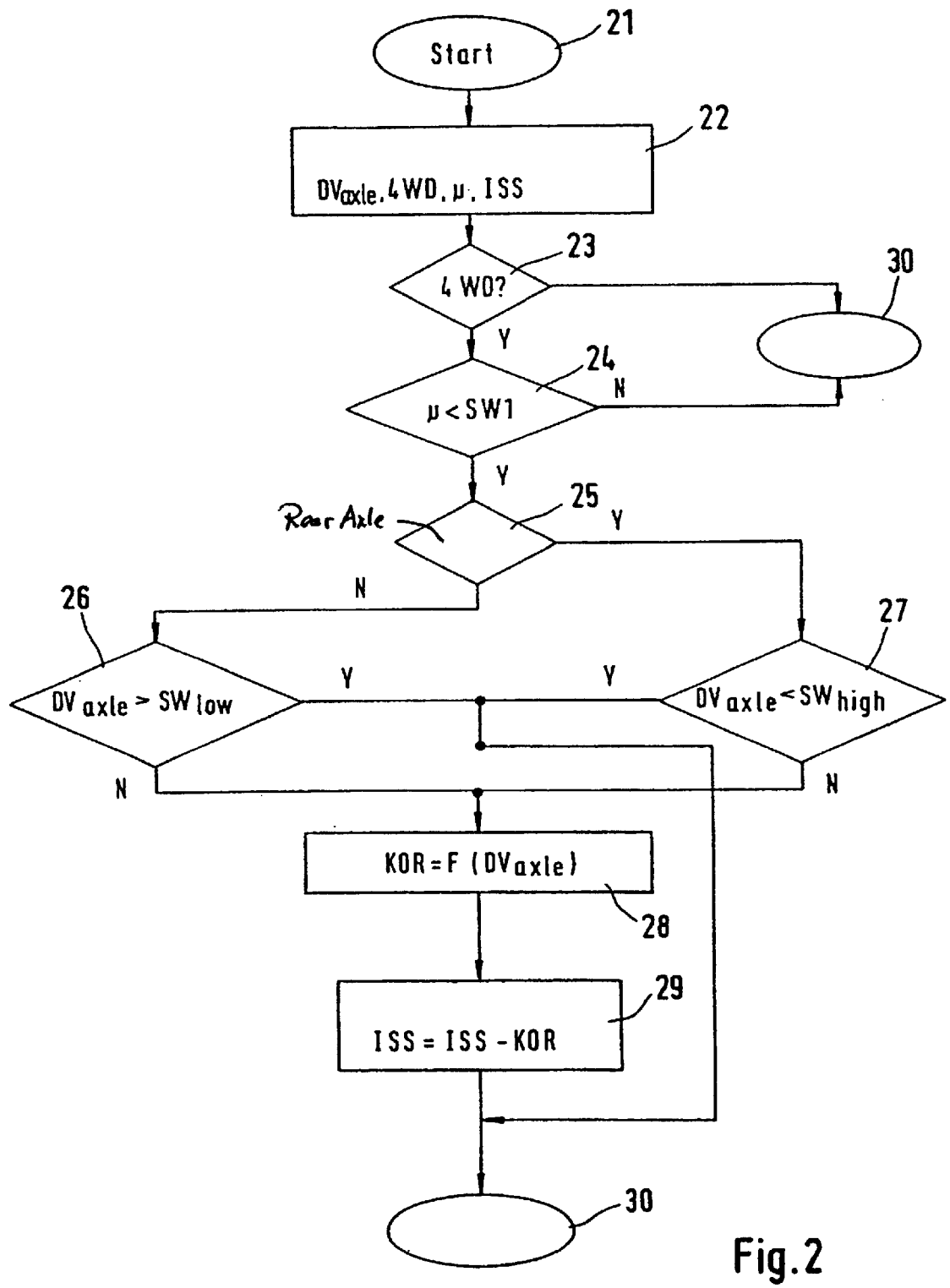
FIG. 2 shows an exemplary flowchart illustrating the functionality of the device and method of FIG. 1.

As shown in FIG. 2, in step 22, following start step 21, input quantities $DV_{axle}$, 4 WD, $\mu$ and ISS are read in.

In step 23, the system queries whether a four-wheel-drive having a locked differential is involved. If not, the system goes directly to end step 30.

If a four-wheel-drive of this kind is involved, in step 24 the system queries whether coefficient of friction $\mu$ is less than a preassignable threshold value SW1. If not, the vehicle is moving along a road with good grip, therefore the system goes directly to end step 30.

However, if the road has a low or medium coefficient of friction (e.g., ice or snow), in step 25 the system determines whether the wheel to be controlled is on the front or rear axle.

FIG. 3 shows an exemplary illustration for explaining steps 26, 27, 28 and 29.

If, as in this example, the right rear wheel is being considered, in step 27 the system queries whether axle vibration value $DV_{axle}$ is less than positive threshold value $SW_{high}$. If so (range A, B or C illustrated in FIG. 3), this means either that axle vibration value $DV_{axle}$ is not sufficiently large (e.g., range B and C) or that on average the rear-axle wheels are turning significantly faster than the front-axle wheels (e.g., range A). As described above, if the brake pressure on the rear-axle wheels were increased, this would reduce value $DV_{axle}$; however, in this exemplary embodiment, in order to reduce value $DV_{axle}$ the brake pressure may only be reduced. For this reason, if the result of the query in step 27 is 'Yes', instability value ISS is not to be modified on the rear axle. The system therefore goes directly to end step 30.

However, if the wheel in question is on the front axle, in step 26 the system queries whether axle vibration value $DV_{axle}$ is greater than negative threshold value $SW_{low}$. If so (range B, C or D illustrated in FIG. 3), this means either that axle vibration value $DV_{axle}$ is not sufficiently large (e.g., range B and C) or that on average the front-axle wheels are turning significantly faster than the rear-axle wheels (e.g., range D). As described above, if the brake pressure on the front-axle wheels were increased, this would reduce value $DV_{axle}$; however, in this exemplary embodiment, in order to reduce value $DV_{axle}$ the brake pressure may only be reduced. For this reason, if the result of the query in step 26 is 'Yes', instability value ISS is not to be modified on the front axle. The system therefore goes directly to end step 30.

However, if the results of the queries in steps 26 (e.g., the front axle) and 27 (e.g., the rear axle) are 'No', value $DV_{axle}$ lies within range A (e.g., the front axle) or range D (e.g., the rear axle). In step 28, correction value KOR is generated, this being function F of axle vibration value $DV_{axle}$. In step 29, instability value ISS is reduced by this correction value KOR. The function may also be dependent on further criteria; for example, value KOR may be selected as a function of the axle.

Consider blocks 108, 109 and 110 described above and shown in FIG. 1. If value ISS is reduced, reduction of the brake pressure (block 109) will be triggered sooner than if there were no $DV_{axle}$-based reduction. Thus, in the case of the front-axle wheels, in range A (see FIG. 3) brake pressure on the front axle will be reduced sooner. In the case of the rear-axle wheels, in range D (see FIG. 3) brake pressure on the rear axle will be reduced sooner.

Following end step 30, the method according to the present invention starts again at the beginning of the flowchart shown in FIG. 2.

According to the exemplary embodiment of the present invention described above, the instability/stability criterion for normal anti-lock control is modified as a function of the level of axle vibrations. In this way, brake pressure will be reduced on the axle having the slower-turning wheels, thereby ensuring that the wheel speed on that axle increases. This occurs if the vehicle is in four-wheel-drive mode and is on a road having a low coefficient of friction, and the axle vibrations lie outside a preassignable range ($SW_{low}$, $SW_{high}$).

What is claimed is:

1. A method for damping vibrations of a four-wheel drive motor vehicle generated during a braking action, comprising the steps of:
   detecting a first rpm signal and a second rpm signal, the first rpm signal representing rotational speeds of wheels of a front axle of the four-wheel drive motor vehicle during a braking action, the second rpm signal representing rotational speeds of wheels of a rear axle of the four-wheel drive motor vehicle during the braking action;
   determining at least one difference value between the first rpm signal and the second rpm signal; and
   controlling the braking action to damp vibrations of the vehicle as a function of the at least one difference value, the damping step including:
      increasing the braking action on a first axle of the front and rear axles which has a higher rpm rate as a function of the at least one difference value.

2. The method according to claim 1, further comprising the step of:
   determining a particular quantity representing at least one characteristic of a road surface, wherein the damping step is performed only if the particular quantity is less than a predetermined threshold value.

3. The method according to claim 2, wherein the at least one characteristic includes a friction coefficient of a road.

4. The method according to claim 1, wherein the four-wheel-drive motor vehicle has a drive train including a device which is capable of being at least partially blocked, the device being one of a differential or a differential gear unit, and wherein the damping step is performed only if the device is at least partially locked.

5. The method according to claim 1, wherein the damping step is controlled if the at least one determined difference value is outside at least one predetermined range.

6. The method according to claim 1, further comprising:
   determining the first rpm signal by adding together rotational speeds of each of the wheels of the front axle; and
   determining the second rpm signal by adding together rotational speeds of each of the wheel of the rear axle.

7. The method according to claim 1, wherein the damping step includes damping the vibrations only if the at least one difference value is outside a preselected value range, the value range having a preselected upper limit and a preselected lower limit.

8. A method for controlling a braking action of a four-wheel drive motor vehicle to dampen vibrations, comprising:
   detecting a first rpm signal and a second rpm signal, the first rpm signal representing rotational speeds of wheels of a front axle of the four-wheel drive motor vehicle during a braking action, the second rpm signal representing rotational speeds of wheels of a rear axle of the four-wheel drive motor vehicle during the braking action;
   determining at least one difference value between the first rpm signal and the second rpm signal;
   controlling the braking action as a function of the at least one determined difference value to dampen vibrations, wherein the braking action is controlled to increase the braking action on a first axle of the front and rear axles which has a higher rpm rate as a function of the at least one determined difference value;
   determining an instability value for at least one particular wheel of the four-wheel-drive motor vehicle as a function of the first and second detected rpm signals; and
   modifying the instability value as a function of the at least one determined difference value;
   wherein the braking action is controlled as a further function of at least one of the instability value and the at least one determined difference value.

9. The method according to claim 8 wherein the braking action is controlled if the at least one particular wheel tends to lock.

10. A device for damping vibrations of a four-wheel-drive motor vehicle caused by a braking action, the four-wheel-drive motor vehicle including at least one rear axle and at least one front axle, the device comprising:
    an arrangement
       detecting a first rpm signal and a second rpm signal, the first rpm signal representing the rotational speeds of wheels of the at least one front axle during a braking action, the second rpm signal representing rotational speeds of wheels of the at least one rear axle during the braking action,
       determining at least one difference value between the first rpm signal and the second rpm signal, and
       damping vibrations of the vehicle as a function of the at least one determined difference value, the damping including:
          increasing the braking action on a first axle of the front and rear axles which has a higher rpm rate as a function of the at least one determined difference value.

11. The device according to claim 10,
    wherein the arrangement determines a particular quantity representing at least one characteristic of the road, and
    wherein the damping is performed only if the determined particular quantity is less than a predetermined threshold value.

12. The device according to claim 11,
    wherein the motor vehicle includes a drive train which has an apparatus which is capable of being at least partially locked, the apparatus being one of a differential and a differential gear unit, and
    wherein the damping is performed only if the apparatus is at least partially locked.

13. The device according to claim 11, wherein the at least one characteristic includes a coefficient of friction of the road.

14. The device according to claim 10,
    wherein the motor vehicle includes a drive train having an apparatus which is capable of being at least partially locked, the apparatus being one of a differential and a differential gear unit, and
    wherein the damping is performed only if the apparatus is at least partially locked.

15. The device according to claim 14, wherein the arrangement determines a particular quantity representing at least one characteristic of the road, and wherein the damping is performed only if the determined particular quantity is less than a predetermined threshold value.

16. The device according to claim 15, wherein the at least one characteristic includes a coefficient of friction of the road.

17. The device according to claim 10, wherein the damping is performed only if the at least one determined difference value is less than or greater than at least one threshold value.

18. The device according to claim 10, wherein the arrangement is configured to determine the first rpm signal by adding together rotational speeds of each of the wheels of the front axle, and to determine the second rpm signal by adding together rotational speeds of each of the wheels of the rear axle.

19. The device according to claim 10, wherein the arrangement is configured to damp the vibrations only if the at least one difference value is outside a preselected value range, the value range having a preselected lower limit and a preselected upper limit.

20. A method for damping vibrations of a four-wheel drive motor vehicle caused by a braking action, comprising:

detecting a first rpm signal and a second rpm signal, the first rpm signal representing rotational speeds of wheels of a front axle of the four-wheel drive motor vehicle during a braking action, the second rpm signal representing rotational speeds of wheels of a rear axle of the four-wheel drive motor vehicle during the braking action;

determining at least one difference value between the first rpm signal and the second rpm signal;

damping the vibrations of the four-wheel drive motor vehicle as a function of the at least one determined difference value, the damping step including:

increasing the braking action on a first axle of the front and rear axles which has a higher rpm rate as a function of the at least one determined difference value;

determining an instability value for at least one particular wheel of the four-wheel-drive motor vehicle as a function of the first and second detected rpm signals; and modifying the instability value as a function of the at least one determined difference value;

wherein the braking action is controlled as a function of at least one of the instability value and the at least one determined difference value.

* * * * *